(12) United States Patent
Epaud et al.

(10) Patent No.: US 11,040,641 B2
(45) Date of Patent: Jun. 22, 2021

(54) MOTOR VEHICLE SEAT

(71) Applicant: Faurecia Sièges d'Automobile, Nanterre (FR)

(72) Inventors: David Epaud, Lardy (FR); Farouk Bouzid, Bretigny sur Orge (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 16/449,231

(22) Filed: Jun. 21, 2019

(65) Prior Publication Data
US 2019/0389335 A1 Dec. 26, 2019

(30) Foreign Application Priority Data

Jun. 22, 2018 (FR) ..................... 18 55581

(51) Int. Cl.
*B60N 2/00* (2006.01)
*B60N 2/02* (2006.01)
*B60N 2/04* (2006.01)
*B60N 2/06* (2006.01)
*B60N 2/30* (2006.01)
*B60N 2/36* (2006.01)
*B60N 2/20* (2006.01)
(Continued)

(52) U.S. Cl.
CPC ............. *B60N 2/206* (2013.01); *B60N 2/309* (2013.01); *B60N 2/3011* (2013.01); *B60N 2/32* (2013.01); *B60N 2/882* (2018.02); *B60N 2002/363* (2013.01)

(58) Field of Classification Search
CPC ...... B60N 2/206; B60N 2/3011; B60N 2/309; B60N 2/32; B60N 2/882; B60N 2002/363

USPC .................... 297/61, 334, 378.12, 378.14
See application file for complete search history.

(56) References Cited

U.S. PATENT DOCUMENTS 6,464,299 B1 * 10/2002 Castagna ............... B60N 2/206
297/378.12
6,655,738 B2 * 12/2003 Kammerer ........... B60N 2/0292
297/378.12 X
(Continued)

FOREIGN PATENT DOCUMENTS

DE 102007036450 B3 * 1/2009 ............. B60N 2/235
DE 102009007051 B3 * 5/2010 ........... B60N 2/3013
(Continued)

OTHER PUBLICATIONS

Written Opinion corresponding to French application No. FR 1855581, dated May 16, 2019, 5 pages.
(Continued)

*Primary Examiner* — Rodney B White
(74) *Attorney, Agent, or Firm* — Reising Ethington P.C.

(57) ABSTRACT

A vehicle seat having a seat with a seat frame, a backrest with a backrest frame, the backrest frame being pivotally mounted relative to the seat frame around a first transverse axis between at least one deployed position for receiving a seat occupant and a folded position in which the backrest frame is folded opposite the seat frame. The seat further includes on each side of the seat a first and a second connecting rod intended to be fixed on a support of the seat so as to be pivotable about a respective transverse axis to lift the backrest frame relative to the seat support.

19 Claims, 2 Drawing Sheets

(51) Int. Cl.
  *B60N 2/882* (2018.01)
  *B60N 2/32* (2006.01)

(56) References Cited

U.S. PATENT DOCUMENTS

| | | | | |
|---|---|---|---|---|
| 7,300,107 | B2* | 11/2007 | Kammerer | B60N 2/0292 |
| | | | | 297/334 X |
| 8,016,354 | B2* | 9/2011 | Veluswamy | B60N 2/3031 |
| | | | | 297/61 X |
| 8,182,037 | B2* | 5/2012 | Jeong | B60N 2/3011 |
| | | | | 297/61 X |
| 8,313,144 | B2* | 11/2012 | Holdampf | B60N 2/22 |
| | | | | 297/378.12 X |
| 8,424,969 | B2* | 4/2013 | Kammerer | B60N 2/12 |
| | | | | 297/378.12 X |
| 8,474,910 | B2* | 7/2013 | Kammerer | B60N 2/22 |
| | | | | 297/334 |
| 2005/0269830 | A1 | 12/2005 | Epaud | |
| 2006/0006720 | A1* | 1/2006 | Yamada | B60N 2/3011 |
| | | | | 297/378.12 |
| 2006/0113828 | A1* | 6/2006 | Ryan | B60N 2/309 |
| | | | | 297/336 |
| 2009/0058149 | A1* | 3/2009 | Lindsay | B60N 2/20 |
| | | | | 297/61 |
| 2011/0221239 | A1* | 9/2011 | Holdampf | B60N 2/2356 |
| | | | | 297/61 |
| 2011/0316317 | A1* | 12/2011 | Sprenger | B60N 2/3065 |
| | | | | 297/344.1 |
| 2014/0333098 | A1* | 11/2014 | DeForest | B60N 2/206 |
| | | | | 297/61 |
| 2015/0291066 | A1* | 10/2015 | Han | B60N 2/3031 |
| | | | | 297/61 |
| 2017/0080831 | A1* | 3/2017 | Kaemmerer | B60N 2/309 |
| 2019/0366886 | A1* | 12/2019 | Sivaraj | B60N 2/757 |
| 2020/0001742 | A1* | 1/2020 | Epaud | B60N 2/0224 |
| 2020/0101872 | A1* | 4/2020 | Epaud | B60N 2/0232 |
| 2020/0101873 | A1* | 4/2020 | Cluet | B60N 2/065 |

FOREIGN PATENT DOCUMENTS

| | | | | |
|---|---|---|---|---|
| DE | 102014000504 B4 * | 5/2016 | | B60N 2/3061 |
| DE | 102015222133 A1 * | 5/2017 | | B60N 2/3065 |
| DE | 102016225843 A1 * | 2/2018 | | B60N 2/3011 |
| FR | 2929179 A1 | 10/2009 | | |
| JP | H08258599 A | 10/1996 | | |
| JP | H10250432 A | 9/1998 | | |
| WO | WO2010001052 A2 | 1/2010 | | |
| WO | WO-2015107212 A1 * | 7/2015 | | B60N 2/0232 |
| WO | WO-2015113958 A1 * | 8/2015 | | B60N 2/3031 |
| WO | WO2018046433 A1 | 3/2018 | | |

OTHER PUBLICATIONS

French Search Report corresponding to French application No. FR 1855581, dated May 16, 2019, 2 pages.

* cited by examiner

MOTOR VEHICLE SEAT

TECHNICAL FIELD

The present disclosure relates to a motor vehicle seat, to a motor vehicle seat assembly and to a motor vehicle comprising such a motor vehicle seat.

BACKGROUND

In the automotive field, it is common to make seats, particularly rear seats, which can be folded so as to enlarge the size of the trunk.

It is also known folding seats that can be folded in such a way that backrest can be used as armrest or table for occupants of neighboring seats.

SUMMARY

The present disclosure aims to present an improved motor vehicle seat device with respect to existing devices.

To this end, herein is described a vehicle seat, notably a rear seat, comprising a seat with a seat frame, a backrest with backrest frame, the backrest frame being pivotally mounted relative to the seat frame around a first transverse axis between at least one deployed position for receiving a seat occupant and a folded position in which the backrest frame is folded facing the seat frame, the seat further including on each side of the seat both first and second connecting rods for attachment to the seat support so as to be pivotable about a respective transverse axis in order to lift the backrest frame relative to said seat support.

Thus, this seat can notably take three distinct positions. In the first position, the seat can receive an occupant. In the second position, the backrest is folded towards the seat, so as to enlarge the trunk of the motor vehicle. Finally, by raising the folded backrest relative to the seat support, the folded backrest can be used as a table, console or armrest by potential occupants of neighboring seats.

In notable embodiments, the described vehicle seat has one or more of the following features, taken alone or in combination:
the vehicle seat includes a flange on each side, as well as a device for inclining the backrest frame relative to the flanges, the tilting device preferably being discontinuous;
on each side of said seat, the first and second connecting rods are fixed to the flange so as to be pivotable about a respective transverse axis;
the seat frame is attached to a third connecting rod, pivotally about a transverse axis, the third connecting rod is further intended to be fixed on the seat support so as to pivot about a transverse axis;
the vehicle seat further includes a headrest, fixed to the backrest frame, the headrest preferably being movable relative to the backrest frame;
the vehicle seat includes a latch, preferably fixed to the flange if appropriate, adapted to lock the position of the flange relative to the vehicle seat support;
the vehicle seat comprises an actuator for adjusting the angular position of the backrest frame relative to the flanges; and
the vehicle seat comprises an actuator for adjusting the angular position of the first and second connecting rods relative to the seat support.

In another aspect, a vehicle seat assembly is also disclosed, comprising the vehicle seat as hereinbefore described in all of its combinations, and a vehicle seat support on which the first, second and third connecting rods are fixed pivotally, where appropriate, about a respective transverse axis.

The seat support may be or may include a slide rail intended to be fixed to the floor of the motor vehicle.

Also described is a motor vehicle comprising a chassis defining a passenger compartment with a floor, and a vehicle seat assembly as described above in all its combinations, the vehicle seat support being fixed to the floor of the passenger compartment or being formed by said floor.

Finally, described herein is a method of folding the motor vehicle seat as described above in all its combinations or included in a seat assembly as described above in all its combinations, from said at least one position deployed to a console position, comprising the steps of:
if necessary, disengage the backrest frame tilting device relative to the flanges;
fold down the backrest frame opposite the seat frame;
if necessary, unlock the latch;
if necessary, engage the backrest frame tilting device relative to the flanges;
rotate the first and second connecting rods to lift the backrest frame relative to the seat support until reaching the console position; and
if necessary, lock the seat in the console position.

BRIEF DESCRIPTION OF THE DRAWINGS

Other features and advantages of the disclosed seat will appear upon reading the following description of an exemplary embodiment, given by way of non-limiting example, with reference to the accompanying drawings, in which.

DETAILED DESCRIPTION

In the different figures, the same reference numbers are used to designate identical or similar elements. For brevity, only the elements that are useful for understanding the described embodiment are shown in the figures and are described in detail below.

In the description which follows, when reference is made to absolute position qualifiers, such as the terms "forward," "backward," "up," "down," "left," "right," etc., or relative, such as the terms "above," "below," "upper," "lower," etc., or with qualifiers for orientation, such as "horizontal," "vertical," etc., it is done reference, unless otherwise specified, to the orientation of the figures or to the seat in its normal position of use.

Figure 1:
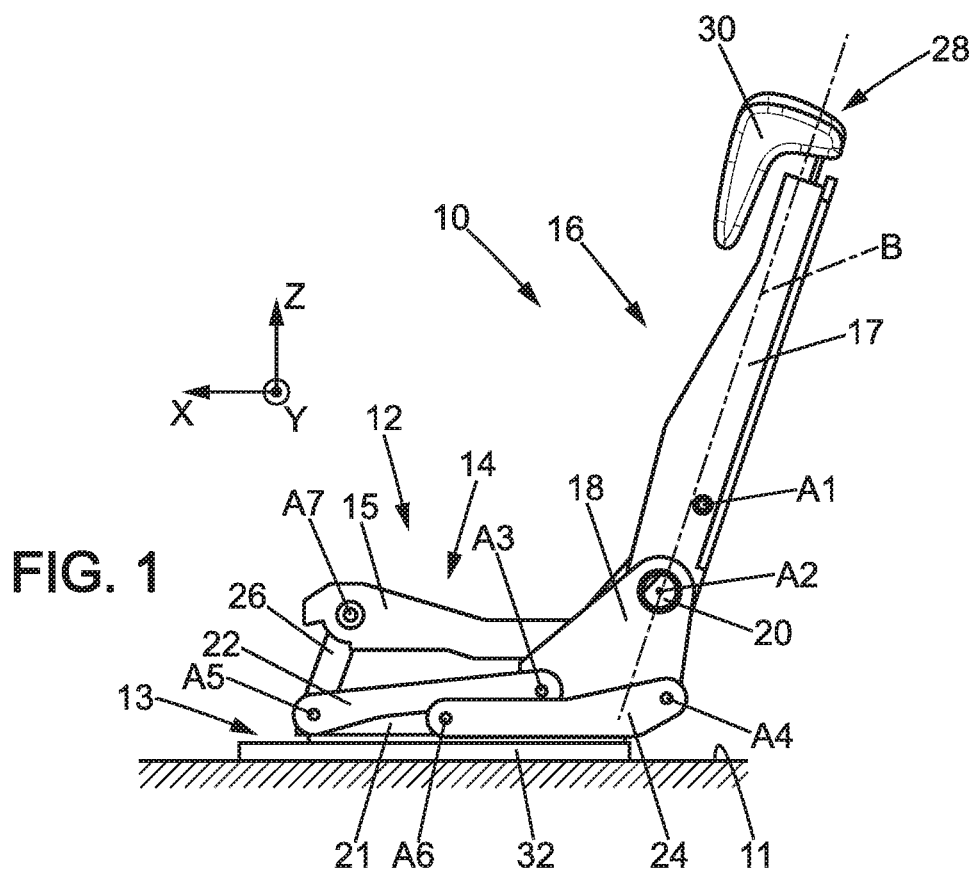
FIG. 1 shows schematically a side view of a vehicle seat assembly in a first position called "deployed"

FIG. 1 schematically shows a motor vehicle seat assembly 10 comprising a motor vehicle seat 12 mounted on a slide mechanism 13 for attaching the vehicle seat device 12 to the floor 11 of a motor vehicle. The floor 11 is, for example, formed by the chassis of the motor vehicle. Motor vehicle seat 12 is advantageously a rear seat.

In the following, the longitudinal direction X is the longitudinal direction of the seat. The longitudinal direction of the seat is considered to be the same as the longitudinal direction of the motor vehicle in which the seat is mounted. This longitudinal direction X corresponds to the normal direction of travel of the vehicle. The transverse direction Y is the transverse direction of the seat. The transverse direction of the seat thus corresponds to the transverse or lateral direction of the motor vehicle. This transverse direction corresponds to a direction perpendicular to the normal direction of advancement of the vehicle. Finally, the vertical direction Z is a vertical direction of the seat, perpendicular to the longitudinal and transverse directions.

The seat 12 comprises a seat 14, with a seat frame 15 and a backrest 16, with a backrest frame 17. Advantageously, the backrest frame 17 is pivotally mounted relative to the seat frame 15 around a first transverse axis A1, that is to say an axis parallel to the direction Y.

In the following, described is one side of the car seat 12, it being understood that the two sides of the seat 12 are substantially identical.

The backrest frame 17 is also pivotally mounted about a second transverse axis A2 relative to a flange 18. In this case, a hinge mechanism 20 is interposed between the flange 18 and the backrest frame 17. The hinge mechanism 20 is, for example, a discontinuous mechanism, that is to say it is adapted to adjust the angular position of the backrest frame 17 relative to the flange 18 in a finite number of discrete positions. The hinge mechanism 20 may advantageously have a "disengaged" mode to fold down the backrest frame 17, for example in the position shown in FIG. 2, as opposed to the "engaged" mode in which the hinge mechanism allows for adjusting the inclination of the backrest frame 17. Preferably, the hinge mechanism 20 is electrically controlled. Thus, the adjustment of the inclination of backrest frame 17 is achieved by means of control buttons for the hinge mechanism 20. To do this, the hinge mechanism 20 may for example comprise a drive motor. The drive motor can then be controlled by means of the control buttons. Alternatively, the hinge mechanism 20 may notably be a "hook-and-cable" type system, comprising a cam and having an angular adjustment range in which the hinge mechanism is not locking (disengaged position), and another adjustment range, distinct from the first, in which the hinge mechanism can be locked (engaged position). For example, the hinge mechanism must be unlocked in order to adjust its angular position, the adjustment being made by keeping the hinge mechanism unlocked. Then, once the satisfactory angular position is reached, the articulation mechanism 20 is locked again.

In the illustrated example, the flange 18 is connected to support 21 of the seat, by means of first and second connecting rods 22, 24. Each connecting rod 22, 24 is pivotally mounted near a first end of the flange 18 around a third and a fourth transverse axis A3, A4 respectively. Each rod 22, 24 is also pivotally mounted, in the vicinity of its second end, on support 21, around a fifth and a sixth transverse axis A5, A6 respectively.

An actuator may advantageously be provided for adjusting the angular position of the connecting rods 22, 24 relative to the support 21 of the seat. For example, a jack, particularly an electric jack, can be provided between support 21 of the seat and one of the connecting rods 22, 24. In this case, the jack is advantageously mounted free to rotate about transverse axes at each of its ends, with respect to the support 21, on the one hand, and the connecting rod 22, 24, on the other hand.

Here, a third connecting rod 26 connects the seat frame 15 and the support 21. This third connecting rod 26 is mounted free to rotate about a seventh transverse axis A7 with respect to the seat frame 15, in the vicinity of a first end. In the vicinity of its second end, the third connecting rod 26 is here mounted free to rotate relative to the support 21, around the same fifth axis A5 around which the first connecting rod 22 can pivot relative to the support 21.

Furthermore, the seat 12 comprises a headrest 28 with a headrest frame 30. The headrest frame 30 is mounted on the backrest frame 17. For example, the headrest frame 30 can be moved relative to the backrest frame 17, particularly in translation, to adjust the height of the headrest 28.

Finally, in the illustrated example, seat support 21 forms a rail, in this case a movable rail, for slide mechanism 13, support 21 being received in rail 32, in this case a fixed rail, for the slide mechanism 13, fixed to the floor 11. Thus, the slide mechanism 13 can adjust the longitudinal position of the seat 12 in the vehicle.

Figure 2:
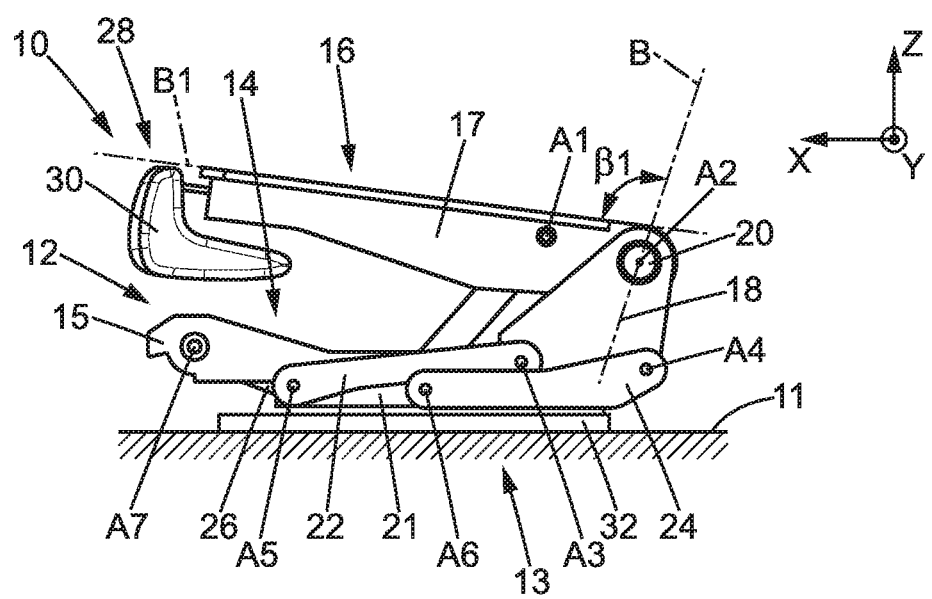
FIG. 2 is a side view of the seat assembly of FIG. 1 in a second position called "folded"
Figure 3:
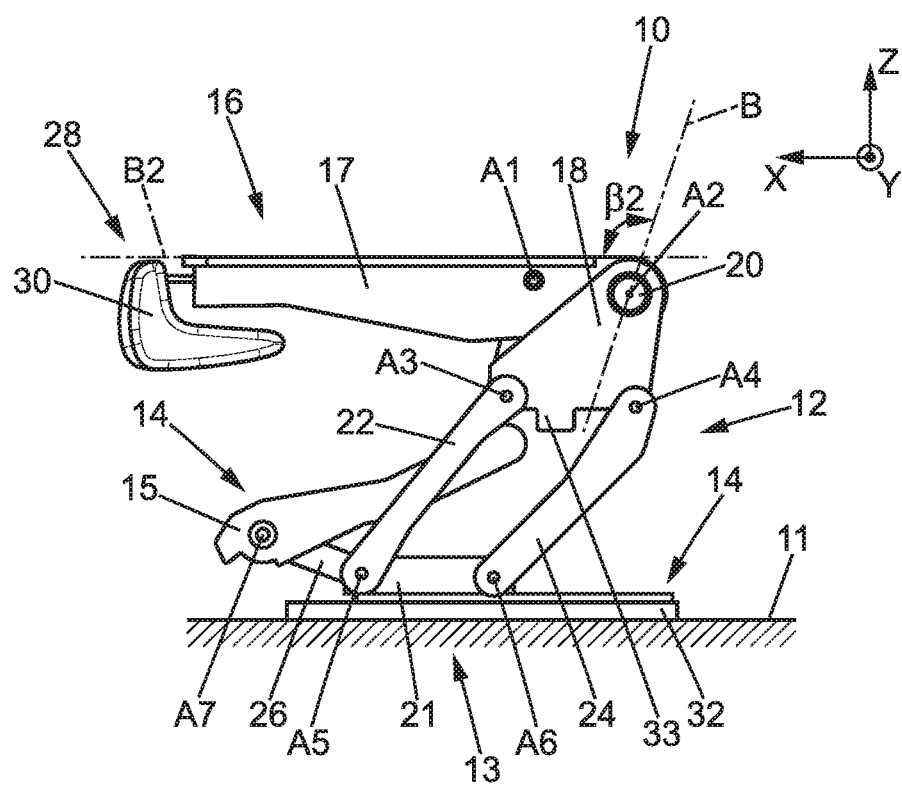
FIG. 3 shows a side view of the seat assembly of FIGS. 1 and 2, in a third position called "console."

As illustrated in FIGS. 1 to 3, the seat assembly 10 which has just been described can notably take three distinct positions, corresponding to three different uses.

In a first position, called "deployed", illustrated in FIG. 1, the seat 12 is in a position to receive an occupant in seat 12. In this position, the backrest frame 17 and the seat frame 15 form an angle substantially equal to 90° or even greater than 90°. For example, the angle between the backrest frame 17 and the seat frame 15 is greater than or equal to 80°, preferably greater than or equal to 85° and/or less than or equal to 120°, preferably lower than or equal to 115°.

In this deployed position, the first and second connecting rods 22, 24 are in a low position, these connecting rods 22, 24 forming a substantially zero angle, for example less than 5°, with the support 21 of the seat 12.

On the contrary, the third connecting rod 26 is in a raised position, the angle between the third connecting rod 26 and the support 21 of the seat being here substantially equal to 90°. For example, the angle between the third connecting rod 26 and the support 21 of the seat is greater than or equal to 60°, preferably greater than or equal to 70° and/or less than or equal to 130°, preferably less than or equal to 110°. Thus, the seat frame 15 is in a high position, that is to say at a distance from the first and second connecting rods 22, 24 and/or the support 21 of the seat. Above all, the seat frame 15 is then at a distance from the floor 11 of the motor vehicle, so that the seat 10 is in a position allowing an occupant to sit there comfortably.

This position is maintained for example by blocking the actuator for adjusting the angular position of the first and second connecting rods 22, 24 in their corresponding position (particularly in their corresponding length).

Alternatively or in addition, this "deployed" position is maintained by blocking the position of the flange 18 on the support 21, the rail 32 of the slide mechanism 13 or the floor 11 of the motor vehicle, by means of a latch 33 (shown schematically in FIG. 3). The latch 33 can also cooperate with a bar integral with the support 21, the rail 32 or the floor 11.

In this position, the inclination of the backrest frame 15 can be adjusted by means of the hinge mechanism 20. Thus, there are in fact many deployed positions.

In addition, for security purposes, the angular position of the third connecting rod 26 can be locked in its corresponding angular position, by means of any locking device accessible to those skilled in the art. In particular, a locking catch may be provided.

The hinge 20 can be locked in the position of FIG. 1. In this deployed position of FIG. 1, the back of the backrest frame 17 can extend in a direction B.

FIG. 2 illustrates the folded position of the seat 12.

In this folded position, the position of the first and second connecting rods 22, 24 is unchanged. However, the angular position of the backrest frame 17 has been modified, so that the backrest frame 17 is placed in a substantially horizontal position, opposite the seat frame 15. To reach this position of the backrest frame 17, the articulation mechanism 20, for example, has been moved into the disengaged position and the backrest frame 17 has been folded down. Thus, the articulation mechanism 20 is preferably free, so that the backrest 16 is a priori movable relative to the seat 14.

In the illustrated example, the back of the backrest frame 17 extends in a direction B1 forming with the axis B, corresponding to the deployed position, an angle β1 included, for example, between 100 and 105°, advantageously between 101 and 104°.

The folding of the backrest frame 17 is accompanied by a displacement of the seat frame 15 and the third connecting rod 26. In fact, in the folded position, the third connecting rod 26 is more inclined relative to the support 21 than in the deployed position. In other words, the angle between the third connecting rod 26 and the support is greater in the folded position than in the deployed position. This brings the seat frame 15 closer to the support 21 and/or the floor 11. It is then possible to maintain the seat position by blocking the angular position of the third connecting rod 26 relative to the support 21. There again, any blocking system accessible to those skilled in the art can be implemented, including a locking catch.

Finally, in the so-called console position, illustrated in FIG. 3, the first and second connecting rods 22, 24 are pivoted relative to their positions corresponding to the deployed and folded seat positions, previously described, to lift the flange 18 relative to the support 21 of the seat and therefore the floor 11. To do this, the first and second connecting rods 22, 24, the support 21 and the flange 18 may, for example, substantially form a deformable parallelogram. The lifting of the flange 18 relative to the support 21 is thus controlled by the actuator for adjusting the angular position of the first and second connecting rods 22, 24.

To move into the console position, the latch 33 is unlocked beforehand.

To maintain the position of the backrest frame 17, the hinge mechanism 20 is in an angular locking position of the backrest frame 17 relative to the flange 18. For example, this backrest frame position 17 corresponds to that in which the back of the backrest frame 17 is substantially horizontal. Substantially horizontal here forming an angle of plus or minus 10° with respect to the horizontal direction. Thus, in this position, the backrest frame 17 can advantageously be used as a console, table or armrest, notably for occupants of vehicle seats adjacent to seat 12.

In this so-called console position, the angular position of the third connecting rod 26 relative to the support 21 can also be blocked. Any locking device in the angular position of the third connecting rod 26 with respect to the support 21, accessible to those skilled in the art can be envisaged. In particular, a locking catch can be implemented.

In the position illustrated in FIG. 3, by way of example, the angle between the direction B2 of the back of the backrest frame 17 and the direction B of this same back of the backrest frame 17, in the deployed position, forms an angle β2, which may for example be greater than or equal to 100°, preferably greater than or equal to 107° and/or less than or equal to 115°, preferably less than or equal to 110°. The angle β2 here is substantially equal to 108°, more precisely equal to 108.75°.

The example vehicle seat assembly described above is capable of many variants accessible to those skilled in the art.

In particular, the seat support can take many forms. Thus, in a particular example, the seat support is formed by the floor of the passenger compartment of the motor vehicle equipped with the seat.

The invention claimed is:

1. A vehicle seat, comprising a seat with a seat frame, a backrest with a backrest frame, the backrest frame being pivotally mounted relative to the seat frame about a first transverse axis between at least one deployed position for receiving a seat occupant and a folded position in which the backrest frame is folded to a substantially horizontal position opposite the seat frame, the seat further comprising on each side of the seat a first connecting rod and a second connecting rod attached to a seat support so as to be pivotable about a first transverse axis and a second transverse axis, respectively, for raising the backrest frame relative to the seat support from the folded position into a console position of the seat with the backrest frame remaining in a substantially horizontal position, such that an angle between a direction of a back of the backrest frame in the console position and a direction of the back of the backrest frame in the at least one deployed position is greater than or equal to 100° and less than or equal to 115°, wherein the first connecting rod and the second connecting rod are configured so that the backrest frame is at a first distance from the seat support in the folded position and the backrest frame is at a second distance from the seat support in the console position, and wherein the second distance is greater than the first distance.

2. The vehicle seat according to claim 1, comprising a flange on each side of the seat and a tilting device for inclining the backrest frame relative to the flanges.

3. The vehicle seat according to claim 2, comprising a latch adapted to lock the position of one or more flanges relative to the seat support of the vehicle seat.

4. The vehicle seat according to claim 3, wherein the latch is fixed to one of the flame flanges.

5. The vehicle seat according to claim 2, comprising an actuator for adjusting the angular position of the backrest frame relative to the flanges.

6. The vehicle seat according to claim 2, wherein the tilting device is discontinuous.

7. The vehicle seat according to claim 2, wherein, on each side of the seat, the first and second connecting rods are fixed to each side of the seat to the flanges so as to be pivotable about a third transverse axis and a fourth transverse axis, respectively.

8. The vehicle seat according to claim 1, wherein the seat frame is pivotally fixed to a third connecting rod.

9. The vehicle seat according to claim 1, further comprising a headrest attached to the backrest frame.

10. The vehicle seat according to claim 9, wherein the headrest is movable relative to the backrest frame.

11. The vehicle seat according to claim 1, comprising an actuator for adjusting the angular position of the first and second connecting rods relative to the seat support.

12. A vehicle seat according to claim 1, further comprising a third connecting rod mounted on the seat support of the vehicle seat pivotally about a third transverse axis, the seat frame being fixed to the third connecting rod, pivotally about a fourth transverse axis.

13. A vehicle seat according to claim 1, wherein the seat support is or comprises a rail for a slide for attachment for slidable longitudinal adjustment with respect to a floor of a motor vehicle.

14. A motor vehicle comprising a chassis defining a passenger compartment with a floor, and a vehicle seat according to claim 1, wherein the seat support is the floor or the seat support is secured to the floor.

15. A method of folding a motor vehicle seat from at least one deployed position to a console position, the motor vehicle seat comprising a seat with a seat frame, a backrest with a backrest frame, the backrest frame being pivotally mounted relative to the seat frame about a first transverse axis between the at least one deployed position for receiving a seat occupant and a folded position in which the backrest frame is folded opposite the seat frame, the seat further comprising on each side of the seat a first connecting rod and a second connecting rod attached to a seat support so as to be pivotable about a first transverse axis and a second transverse axis, respectively, for raising the backrest frame relative to the seat support, comprising the steps of:

folding down the backrest frame from the deployed position to the folded position in which the backrest frame is located opposite the seat frame in a substantially horizontal position, and pivoting the first and second connecting rods to lift the backrest frame relative to the seat support until reaching the console position with the backrest remaining in a substantially horizontal position, wherein the first connecting rod and the second connecting rod are configured so that the backrest frame is at a first distance from the seat support in the folded position and the backrest frame is at a second distance from the seat support in the console position, and wherein the second distance is greater than the first distance.

16. The method of folding a motor vehicle seat according to claim 15, the motor vehicle seat further comprising a flange on each side of the seat and a tilting device for inclining the backrest frame relative to the flanges, the method further comprising a step of disengaging the tilting device of the backrest frame relative to the flanges.

17. The method of folding a motor vehicle seat according to claim 15, the motor vehicle seat further comprising a flange on each side of the seat, a tilting device for inclining the backrest frame relative to the flanges, and a latch adapted to lock the position of the relative to the seat support of the vehicle seat, the method further comprising a step of unlocking the latch.

18. The method of folding a motor vehicle seat according to claim 15, the motor vehicle seat further comprising a flange on each side of the seat and a tilting device for inclining the backrest frame relative to the flanges, the method further comprising a step of engaging the tilting device of the backrest frame relative to the flanges.

19. The method of folding a motor vehicle seat according to claim 15, further comprising a step of locking the seat in the console position.

\* \* \* \* \*